United States Patent

Takacs

[15] 3,700,746
[45] Oct. 24, 1972

[54] ISOMERIZATION OF ALPHA-PINENE
[72] Inventor: Edward Andrew Takacs, Norwalk, Conn.
[73] Assignee: American Cyanamid Company, Stamford, Conn.
[22] Filed: April 1, 1971
[21] Appl. No.: 130,120

Related U.S. Application Data

[63] Continuation-in-part of Ser. No. 845,432, July 28, 1969, abandoned.

[52] U.S. Cl.........260/675.5, 208/DIG. 2, 260/666 A
[51] Int. Cl........C07c 13/00, C09f 3/02, C01b 33/28
[58] Field of Search.....................................260/675.5

[56] References Cited

UNITED STATES PATENTS 3,270,075   8/1966   Derfer et al. ...........260/675.5
3,377,400   4/1968   Wise.......................260/668

Primary Examiner—Delbert E. Gantz
Assistant Examiner—G. E. Schmitkons
Attorney—James H. Laughlin, Jr.

[57] ABSTRACT

A method for producing dipentene is given whereby a pinene-containing feed is isomerized at high temperatures in the presence of a small amount of a molecular sieve zeolite catalyst of the 13X-type which can be represented as follows:

$$1.0 \pm 0.2\ M_2O : Al_2O_3 : 2.5 \pm 0.5\ SiO_2 : y\ H_2O$$

wherein M is an alkali metal and $y$ is a value from 0 to 8.

10 Claims, 1 Drawing Figure

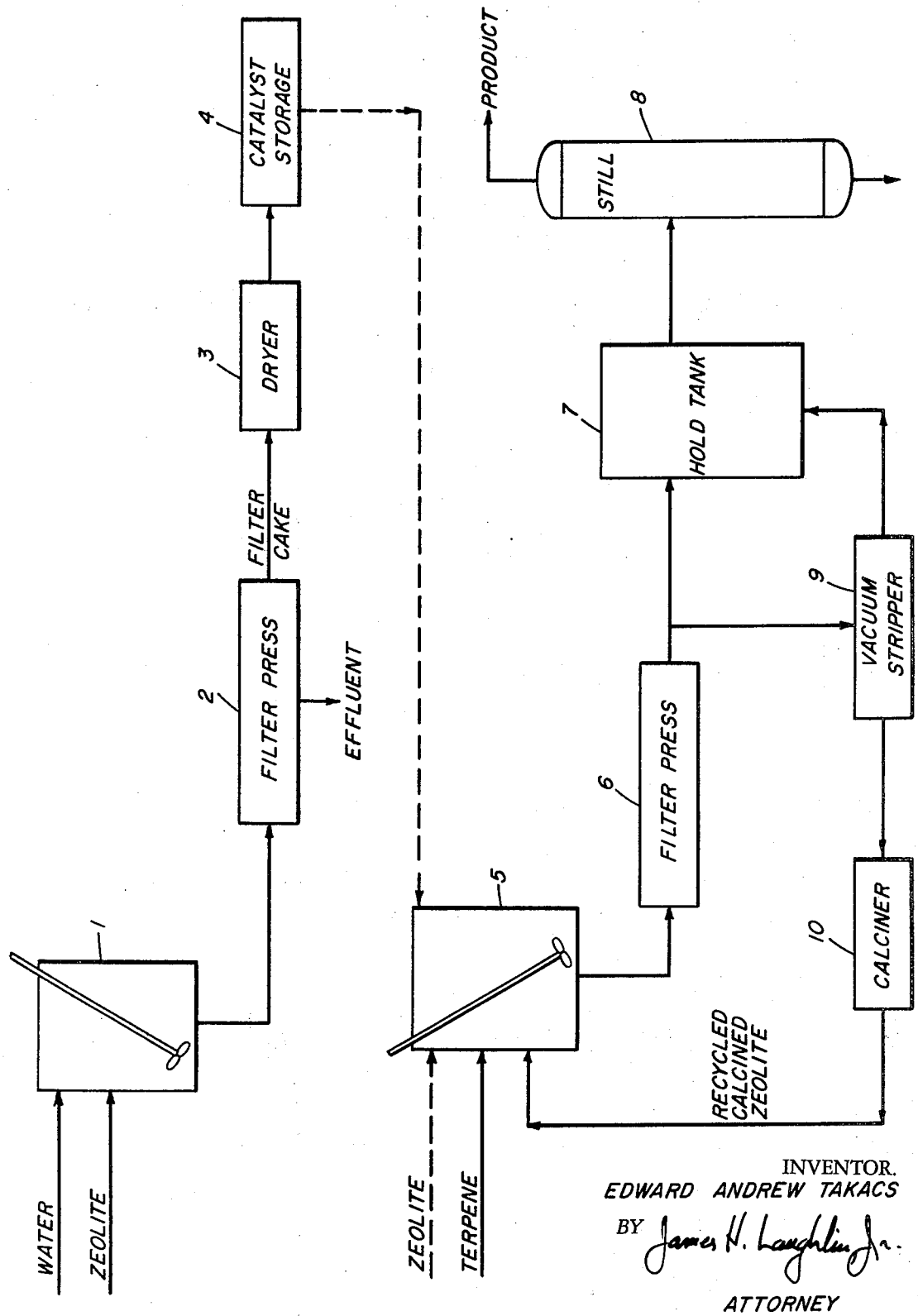

ISOMERIZATION OF ALPHA-PINENE

This application is a continuation-in-part of Ser. No. 845,432, filed July 28, 1969, now abandoned.

This invention relates to an improved process for the isomerization of terpenes, in particular turpentine and α-pinene. More particularly, it relates to the production of dipentene by isomerization of turpentine or α-pinene by means of heating in the presence of a selective catalyst.

Dipentene is an important article of commerce and is in great demand for the production of terpene resins used in hot-melt coatings, adhesives, and the like. The prior art shows many examples of isomerizing α-pinene. For example, U.S. Pat. No. 2,382,641 issued to Kharasch teaches the conversion of optically active α-pinene to limonene which is the optically active form of dipentene. According to the patent, this is accomplished by heating with organic acids, such as benzoylbenzoic or salicylic acids, in the presence of organic acid amides such as formamide or acetamide, at 140°–200°C. for 15–50 hours. The process of the present invention is advantageous in that employment of substantial quantities of expensive organic acids and amides is avoided, and in that the isomerization is effected in a few hours and in excellent yields.

Frilette and Weisz, U.S. Pat. No. 3,140,322, teach the use of activated 10X zeolite to reduce polymer formation in the isomerization of α-pinene which has been found to yield camphene as the main product. In discussing the activity of 13X molecular sieves in the Journal of Physical Chemistry, vol. 64, pp. 382, Weisz and Frilette state that "α-pinene undergoes no reaction when refluxed with the Na⁺ form [13X zeolite], but is converted extensively to camphene by the Ca⁺⁺ salt [10X zeolite]."

U.S. Pat. No. 3,270,075, issued to Derfer et al., teaches the isomerization of α-pinene to a dipentene-rich isomerizate with a 10X or 13X zeolite at a temperature in the range of about 65° to about 110°C. This patent specifically teaches, however, that the use of higher temperatures is detrimental. For example, at column 8, line 24 and following, it is stated that when temperatures of about 135° to 154°C. are employed, considerably more camphene is produced and in most instances camphene becomes the predominant product. Furthermore, in example 1, at column 6, line 20, it is stated that when α-pinene is treated at 150°C. with a 13X molecular sieve catalyst, the isomerizate obtained is found to contain only 10 percent of the desired product.

It is an object of this invention to provide a simple process for producing a high yield of dipentene in an economic manner. A further object is to provide a process for producing dipentene wherein the amount of undesirable by-products is minimized. These and other objects of the present invention will become apparent as the description thereof proceeds.

It has been unexpectedly found that high yields of dipentene can be obtained by isomerizing pinene or turpentine in the presence of a catalyst at temperatures of about 140°C. to about 200°C. This is particularly surprising since high yields of dipentene have been achieved by employing very low amounts of catalyst. Furthermore, only minor amounts of terpinolene and camphene are formed as by-products.

In accordance with this invention a terpene or pinene-containing feed which may include α-pinene, β-pinene, or turpentine is isomerized in the presence of less than about 10 percent of a zeolite catalyst of the 13X-type.

Zeolite X can be represented in terms of mol ratios of oxide as follows:

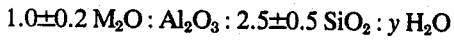

wherein M is an alkali metal and y is a value from 0 to 8 depending upon the identity of the alkali metal and the degree of hydration of the crystal. The sodium form, for example, may be represented as follows:

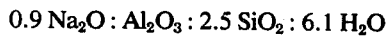

Typically, the anhydrous synthetic sodium zeolites of the X-type have the composition $Na_{86}(AlO_2)_{86}(SiO_2)_{106}$ and an effective pore diameter of about 13 angstroms. Their crystal structures are such that they have a large number of pores characterized by exceptionally uniform size. As sold commercially, these catalysts are in aqueous slurry or substantially dehydrated form normally having a water content of about 1 percent. Other alkali metal sieves including the potassium and lithium sieve are similar to the sodium sieve which for the purposes of this invention is representative. The alkali metal aluminosilicates that the present invention includes are further described in a number of United States Pats. including Nos. 2,882,244 and 3,140,249.

The molecular sieve catalysts employed in this invention are operative over a wide range of water contents as well as in anhydrous form. Wet catalyst can be dried at a temperature of about 100°C. to about 450°C., and preferably at about 300°C., so as to obtain a catalyst having a water content of about 2 to about 6 percent and preferably 4 percent. It has also been found that wet or anhydrous catalyst can be increased in activity by washing and then drying.

I have surprisingly found that when small amounts of the catalyst are used with relatively high temperatures in the isomerization reaction, an unexpectedly high amount of dipentene is produced. In fact, I have found that dipentene can be produced in predominant amounts while by-products and undesirable products which are usually formed in this type of reaction can be minimized and in some cases completely avoided.

In one embodiment of this invention, a pinene is heated at reflux with less than about 10 percent based upon the weight of the feed of 13X molecular sieve zeolite catalyst. The reaction may proceed for any time desired, but it is usually limited to about 1 to 15 hours. The resulting isomerizate is then filtered to remove the molecular sieves which are then recycled, and the isomerizate is fractionated. Dipentene is usually found to be the predominant product.

The isomerization process of the present invention is generally carried out at temperatures of about 140°C. to about 200°C. Preferred reaction temperatures are in the range of about 150°C. to about 175°C. and more preferably from about 154°C. to about 173°C. In general, reaction times of about 1 to 15 hours are employed. Preferably, reaction times are about 2 to 4 hours. The catalyst may be a type-X alkali metal exchanged sieve including sieves which have been sodium, potassium, and lithium exchanged. The amount of catalyst employed may be from about 0.1 to about 5 percent based upon the weight of the feed for normal operations. However, about 0.25 to about 2 percent are preferred. The process may be carried out either batchwise or continuously, and under autogenous, elevated or reduced pressure.

The invention is further illustrated by the Figure which shows a flow diagram of the process.

As shown in the Figure, the zeolite catalyst may optionally be pretreated with water in mixer 1, filtered in filter press 2, dried in dryer 3 and stored at 4. The pretreatment of the catalyst, however, is not necessary to obtain the increased yield of the present invention.

Catalyst either from the storage 4 or untreated, and terpene feed are fed to reactor 5 where the reaction takes place under the conditions previously recited, after which the catalyst and product mixture is separated in filter press 6. The catalyst goes to a vacuum stripper 9 for removal of any remaining product and then to calciner 10 to be heated and recycled to the process. The isomerized product from filter press 6, containing predominantly dipentene but also minor amounts of terpinolene and camphene is cycled to a holding tank 7, which also received the effluent from stripper 9. The combined product from tank 7 is then distilled in still 8 to separate the various fractional products.

The following examples further illustrate the present invention and are not intended to limit the scope thereof in any manner. Unless otherwise stated, all parts and percentages are by weight.

EXAMPLE I

PART 1

500 pounds of 13X molecular sieves (Linde Division of Union Carbide Corporation) were charged to kettle 1 containing 200 gallons deionized water. The mixture was then slurried for 30 minutes and filtered through filter press 2, the effluent being sewered. The filter cake was transferred to drier 3, where it was dried 16 hours at 300°C. prior to transfer to catalyst storage 4.

PART 2

Kettle 5 was purged with an inert gas, preferably nitrogen, prior to charging 3,900 pounds of α-pinene. 39 pounds of the catalyst of Part 1 of this example were then added while agitating at 250 rpm. The port was then closed, and the temperature was raised rapidly. The mixture began to reflux at 162°C., and within 5 hours had reached 172.5°C. Full cooling water was then turned on. The cooled mixture was pumped through filter press 6, with the isomerizate going to holding tank 7 and the filter cake to vacuum stripper 9. The dried filter cake was transferred to calciner 10 where it was calcined 1 hour at 600°C. before being returned to storage.

The isomerizate, on fractionation in still 8 yielded 2,254 pounds dipentene, 407 pounds terpinolene, 627 pounds camphene, 175.5 pounds unreacted α-pinene, and 358 pounds other terpenes.

EXAMPLE II

The procedure of Example I was repeated in every detail except that β-pinene was used as the feedstock.

The isomerizate, on fractionation, yielded 2,106 pounds dipentene, 443 pounds terpinolene, 371 pound α-pinene, 404 pounds camphene, and 240 pounds other terpenes.

EXAMPLE III

The procedure of example I was followed in every detail, except that sulfate turpentine was used as the feedstock.

The isomerizate, on fractionation, yielded 2,067 pounds dipentene, 710 pounds camphene, 472 pounds terpinolene, 421 pounds α-pinene, 31 pounds β-pinene and 140 pounds other terpenes.

EXAMPLE IV

To determine the influence of the temperature at which the catalyst was dried and, indirectly, of moisture content on the rate of the isomerization reaction, the following series of experiments was carried out.

Hydrated 13X catalyst was dried at various temperatures ranging from ambient temperature to 600°C., and the dried catalyst thus obtained was evaluated with regard to its activity towards α-pinene in the following manner.

2.0 g. of catalyst was contacted with 100 g. of α-pinene, and the resulting mixture was heated isothermally under nitrogen at 160°C. Samples of product mixture were withdrawn periodically and analyzed by gas-liquid chromatography. Essentially no polymerized products were formed. Results are shown in table I.

TABLE I

[Effect of H₂O concentration on reactivity of molecular sieve 13X during isomerization of α-pinene]

| Catalyst source | Catalyst conc., percent | Water content of catalyst, percent | Reaction temp., °C | Time (min.) to attain reaction temp. | Percent conversion of α-pinene (hr.) | | | | | | | | | | Percent yield of products based on pinene consumed at maximum indicated conversion [a] |
|---|---|---|---|---|---|---|---|---|---|---|---|---|---|---|---|
| | | | | | 1 | 1½ | 2 | 2½ | 3 | 3½ | 4 | 4½ | 5 | 5½ | 6 | |
| A | 2 | 28.0 | 160 | 120 | 30.0 | | 38.7 | | 45.6 | | 49.3 | 51.4 | | | | Dipentene, 67.8; camphene, 18.4; terpinolene, 8.9. |
| B | 2 | 10.5 | 160 | 60 | 41.2 | | 52.6 | | 61.3 | | 68.8 | | 73.3 | | | Dipentene, 66.6; camphene, 18.2; terpinolene, 9.4. |
| C | 2 | 9.4 | 160 | 30 | 55.9 | | 71.2 | | 80.4 | | 86.7 | | 90.7 | | 94.2 | Dipentene, 63.2; camphene, 17.6; terpinolene, 11.0. |
| D | 2 | 5.3 | 160 | 13 | 75.3 | | 87.8 | 91.6 | 94.2 | | | | | | | Dipentene, 62.2; camphene, 18.0; terpinolene, 11.4. |
| E | 2 | 4.3 | 160 | 12 | 86.6 | 91.8 | 94.8 | | | | | | | | | Dipentene, 63.8; camphene, 18.3; terpinolene, 11.1. |
| F | 2 | 4.5 | 160 | 12 | 53.5 | | 71.6 | | 80.8 | | 87.4 | | 92.7 | | 94.8 | Dipentene, 64.0; camphene, 17.5; terpinolene, 10.8. |

[a] Less than one-half percent non-volatiles found in isomerizate.

A = Catalyst slurry air dried at ambient temperature.
B = A (above) dried at 150° C.
C = A (above) dried at 200° C.
D = A (above) dried at 250° C.
E = A (above) dried at 300° C.
F = A (above) dried at 600° C.

EXAMPLE V

A 250 milliliter round bottom flask equipped with magnetic stirring bar, thermometer, condenser, and a gas inlet tube was charged with 100 grams of freshly distilled α-pinene (98.3 pure) and 5 grams of powdered molecular sieve 13X catalyst of the type employed in example 1. The substance was purged with nitrogen and the contents of the flask were quickly heated to reflux in approximately 20 minutes. Heating was continued until the pot temperature reached 173°C. The reaction mixture was quenched, filtered to remove the catalyst and analyzed.

The analysis found 59.8 grams of dipentene, 18.6 grams of camphene, 10.3 grams of terpinolene, 4.9 grams of unreacted α-pinene and 6.4 grams of other material. The above values were recomputed for completion of the reaction, that is, the 100 percent conversion of α-pinene would result in 64 grams of dipentene and only 36 grams of other by-products.

EXAMPLE VI

A 250 milliliter round bottom flask equipped as in example V was charged with 100 grams of freshly distilled α-pinene (98.3 percent pure) and 1.0 grams of a potassium analog of 13X molecular sieve which was supplied by the Linde Division of Union Carbide. This mixture was heated under nitrogen to reflux for 47 hours. The pot temperature rose from 154.5° to 170°C. and the reaction mixture was quenched, filtered to remove the catalyst and analyzed.

The analysis showed 61.5 grams of dipentene, 13.5 grams of camphene, 5.6 grams of terpinolene, 14.8 grams of α-pinene, and 4.9 grams of other material.

EXAMPLE VII

Example VI was repeated except that 10 grams of potassium sieve were employed and the reaction run in a pressure vessel without nitrogen blend under autogenous pressure for 3½ hours. The analysis found 65.3 grams of dipentene, 18.1 grams camphene, 5.3 grams of terpinolene, 9.9 grams of α-pinene and 1.4 grams of other material.

EXAMPLE VIII 20 grams of molecular sieve of the 13X-type were added to a solution of 68.9 grams of $LiNO_3$ in 500 cc distilled water, slurried for 15 minutes and then filtered. The filter cake was removed and the above treatment was repeated twice. The final filter cake was washed with distilled water to remove residual $LiNO_3$ and was then dried for 16 hours at 300°C.

A 250 ml., 3-necked, round bottom flask equipped with a magnetic stirring bar, thermometer, condenser and a gas inlet tube was charged with 100 gm. of 98.3 percent α-pinene and 1.0 gm. of the lithium analog of 13X catalyst.

The flask was flushed with nitrogen, stirring was initiated and the contents of the flask were quickly heated to reflux. After 3 hours, the pot temperature had reached 171°C. The reaction mixture was then quenched, filtered to remove catalyst and the filtrate was analyzed. The analysis showed 47.1 percent dipentene, 18.4 percent camphene, 18.0 percent terpinolene, 8.2 percent α-pinene, and 7.6 percent of other material.

From the above examples it is clearly shown that by employing small amounts of catalyst at relatively high temperatures, dipentene can be produced in predominant amounts. This is clearly unexpected and particularly surprising when viewed in the light of the prior art. The following illustration demonstrates this finding.

Illustration I

The isomerization of α-pinene was conducted essentially in the manner described by U.S. Pat. No. 3,270,075 according to example I. More particularly, this illustration was conducted according to the description appearing at column 6, lines 20 through 28. Specifically, a mixture of 66 grams of α-pinene and 15 grams of 13X molecular sieve zeolite catalyst was stirred at about 149°C. for 70 hours. The liquid was then separated from the catalyst and the volatile portion analyzed. The analysis is shown in table II.

EXAMPLE IX

The process of illustration I was repeated except that less catalyst was employed. Specifically, 1,000 grams of α-pinene and 1 gram of catalyst identical to the type employed in illustration I were mixed together and stirred at temperatures of between 157° and 170°C. After 8 hours, the liquid was separated from the catalyst and analyzed. The analysis of the product is given below at table II.

TABLE II

| Analysis[a] | Illustration I | Example IX |
| --- | --- | --- |
| Unreacted α-pinene | 4.0% | 17.5% |
| Dipentene | 1% | 48.3% |
| Camphene | 16.4% | 15.1% |
| Other Terpene Hydrocarbons | 78.6% | 19.1% |

[a]The non-volatile portion of Illustration I amounted to 50% while the non-volatile portion of Example IX was less than 1%.

The above table clearly demonstrates that by using very low amounts of catalyst in the isomerization reaction, dipentene can be produced in significant and predominant amounts; while the use of catalyst on the order of 20 percent or more results in isomerization reactions which give small amounts of dipentene and major amounts of other terpene hydrocarbons and non-volatiles.

While certain specific embodiments and preferred modes of practice have been set forth, it will be understood that this is solely for the purpose of illustration, and that various changes and modifications may be made without departing from the spirit of the disclosure or the scope of the appended claims.

I claim:

1. A method for producing dipentene comprising isomerizing a pinene-containing feed at a temperature of from about 140° to about 200°C. for more than about 1 hour in the presence of less than about 10 percent based upon the weight of the feed of a zeolitic molecular sieve catalyst of the 13X-type containing an alkali metal cation selected from the group consisting of sodium, potassium and lithium.

2. The method of claim 1 wherein the pinene-containing feed is predominately α-pinene.

3. The method of claim 1 wherein the pinene-containing feed is predominately β-pinene.

4. The method of claim 1 wherein the pinene-containing feed is turpentine.

5. The method of claim 1 wherein the alkali metal cation is sodium.

6. A method for producing dipentene comprising isomerizing a pinene-containing feed at a temperature of from about 150° to about 175°C. for from about 2 to 5 hours in the presence of from about 0.1 to about 5 percent based upon the weight of the feed of a molecular sieve zeolite catalyst of the 13X-type containing sodium cations.

7. The method of claim 6 wherein the pinene-containing feed is predominately α-pinene.

8. The method of claim 6 wherein the pinene-containing feed is predominately β-pinene.

9. The method of claim 6 wherein the pinene-containing feed is turpentine.

10. The method of claim 6 wherein the isomerization is at a temperature of from about 154° to about 173°C. in the presence of about 0.25 to about 1 percent catalyst for from about 2 to about 4 hours.

* * * * *